United States Patent
Antes

[11] 3,847,469
[45] Nov. 12, 1974

[54] OBJECTIVE-PINHOLE UNIT FOR COHERENT LIGHT

[75] Inventor: Gregor Antes, Zurich, Switzerland

[73] Assignee: Jodon Engineering Associates AG, Wadenswill, Switzerland

[22] Filed: Aug. 29, 1973

[21] Appl. No.: 392,785

[30] Foreign Application Priority Data
Aug. 30, 1972 Switzerland.................... 12781/72

[52] U.S. Cl............... 350/247, 350/205, 350/178, 350/257, 331/94.5 C
[51] Int. Cl. ........................................... G02b 7/02
[58] Field of Search ........................ 350/205–210, 350/178, 247, 257, 245, 271; 331/94.5

[56] References Cited
UNITED STATES PATENTS
3,286,193  11/1966  Koester.............................. 350/205
3,731,991  5/1973  Arnold................................ 331/94.5

Primary Examiner—Ronald L. Wibert
Assistant Examiner—Michael J. Tokar
Attorney, Agent, or Firm—Waters, Roditi, Schwartz & Nissen

[57] ABSTRACT

A lens-pinhole unit which is prefocussed for use as a beam expanding and spatial filtering device for coherent light comprising an objective lens with a support secured to one end thereof and carrying a pinhole diaphragm, through the intermediary of a hardened synthetic resin layer, at such a position that the pinhole is at the focus of the lens. The unit is mounted in a support and the diaphragm is adjusted on the still soft resin until the pinhole is set at the focus after which the resin hardens in place.

13 Claims, 2 Drawing Figures

OBJECTIVE-PINHOLE UNIT FOR COHERENT LIGHT

BACKGROUND

1. Field of the Invention

This invention relates to a combined objective-pinhole unit for coherent light.

2. Prior Art

Objective-pinhole units are used in the field of coherent optics for converting a plane electromagnetic laser wave of finite cross section superimposed with interference fields into a divergent undistorted spherical wave of finite solid angle. To achieve this, the laser beam with definite half-power radius of its cross section is directed to a system of lenses, for example, a suitable objective lens, which first of all converts the plane laser beam into a spherical beam converging at the focus of the lens system. On the far side of the focus the spherical wave diverges inside a pencil whose half-power angle is given as a function of the focal length of the objective and the half-power radius of the laser beam. The interference fields superimposed in the plane laser wave are focussed on a point distinct from the focus as they arose at centers of dispersion having finite distance from the focussing objective. Such interference fields can be largely eliminated if a diaphragm aperture or pinhole of equivalent diameter between $3\mu$ and $25\mu$ is mounted at the focus, so that only the wave focussed at the focus is passed. This is understood in the art as evident in my article appearing in Applied Optics Vol. 12, No. 3 (March 73) pp 493–495.

The known lens-pinhole units consist of a mechanism wherein an objective is rigidly mounted directionally on one side while on the other side a detachable perforate diaphragm can be displaced along two coordinates perpendicular to the optical axis, while the distance between the objective and the perforate diaphragm is adjustable for focussing.

The aligning of the known lens and pinhole unit must be effected anew for every test setup and after every alteration of the focal length of the objective. Moreover, the procedures for aligning and adjusting the known units are time-consuming even when the operator is experienced. This may be illustrated by a standard utilization in which a target area is to be illuminated from a certain distance by a spherical laser wave free from interference fields.

The following aligning and adjusting procedure is effected for the known lens and pinhole units:

1. Aim the laser beam at the center of the target area without inserting the lens and pinhole unit.
2. Mount the lens and pinhole unit (without inserted perforate diaphragm) at the particular distance from the target area in a suitable holding device with its optical axis visually arranged parallel to the axis of the laser beam.
3. Move the lens and pinhole unit along both coordinate axes perpendicular to the optical axis until the expanded, unfiltered beam is centered around the center of the target area. There is no guarantee here that the laser beam and the optical axis are indeed parallel, since the direction of the emergent cone of light is not only a function of the angle between the optical axis and the incident laser beam, but also on their interaxial displacement.
4. Insert the perforate diaphragm into the lens and pinhole unit and adjust it along its three coordinate axes to center it on the focal point by means of three micrometric adjustment devices. The location of the correct position of the lens and pinhole unit is facilitated by first setting the objective out of focus in such manner that the focal point does not fall precisely in the pinhole diaphragm plane, and consequently a larger area on the diaphragm becomes illuminated. Then after some hunting, a diffraction spot (Airy disk) of low light intensity becomes discoverable on the target area and can be approximately centered on the optical axis by adjustment of the pinhole diaphragm. As the intensity of such diffraction spot is very low, some aid is gained by inserting a white projector screen between the target and the lens-pinhole unit close to the objective. If the objective is now slowly focussed, the diffraction spot gets larger and migrates from the center of the target area; it's off center position is compensated by renewed setting of the pinhole diaphragm along both coordinate axes perpendicular to the optical axis. This adjustment becomes more critical the closer the pinhole diaphragm approaches the focal point. Successive adjustment of the objective along the optical axis and of the pinhole diaphragm along both coordinate axes perpendicular thereto brings the focal point finally into the center of the perforate diaphragm, so that a filtered spherical wave is emitted therefrom and illuminates the target area.

The entire procedure must be repeated for each setup and when the beam direction or the lens power is altered.

SUMMARY OF THE INVENTION

An object of the present invention is to obviate the drawbacks of the troublesome setting procedure of the known lens-pinhole units.

According to the invention, the lens and pinhole unit is characterized by having a support having one end fastened to the front end of an objective, while at the other end of the support a holder is mounted for attachment to a perforate diaphragm by means of a layer of synthetic material enabling the pinhole of the perforate diaphragm to be at the focus of the objective.

The invention is further directed to a process utilizing the lens and pinhole unit in which said lens and pinhole unit is aligned at a particular distance in front of said target area in a tiltable mount which is displaceable in perpendicular direction in a plane perpendicular to the laser beam, for the purpose of illuminating a target area, from a definite distance, with a spherical laser wave free from interference fields. Hence by displacement of the lens-pinhole unit in two directions perpendicular to one another and to the laser beam, the light cone becomes centered on the target area so that the optical axis of the lens and pinhole unit and the laser beam are coaxial.

The invention is also directed to a process for assembling the lens and pinhole unit, and in accordance with the invention, said process is characterized by an objective with a support fastened at one end of the objective and carrying a holder, the objective being mounted on a swivel-and-slide device on which a fine displacement device movable in three mutually perpendicular directions rigidly but releasably holds a perforate diaphragm carrier plate provided with a perforate diaphragm disk in such position as to present an annular gap between the other end of the support and the perforate diaphragm carrier plate, a hardenable synthetic resin layer being introduced into said gap when the optical axis of the objective is aligned, by means of the swivel-and-slide device, coaxially to the laser beam and the carrier plate is shifted by means of the fine displacement device until the center of the aperture in the diaphragm disk lies at the focus of the objective, whereafter the synthetic layer sets and the fine displacement device is removed.

The construction and operation of the invention is also described in the aforesaid article in Applied Optics.

DETAILED DESCRIPTION

Figure 1:
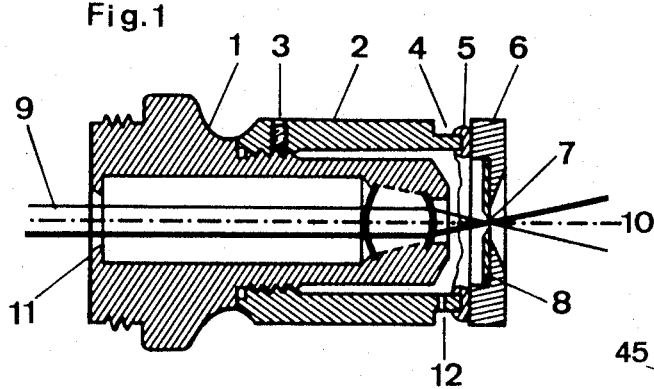
FIG. 1 is a longitudinal section of a lens and pinhole unit according to the invention.

FIG. 1 shows a lens-pinhole unit comprising a glass objective 1 and a carrier capsule or support 2 threaded coaxially on the front end of objective 1 and secured with a grub screw 3. The other end of support 2 is provided with a ledge 4 to which is secured a perforate diaphragm carrier plate 6, by means of a layer of synthetic resin 5, in such a position that a pinhole aperture 7 in a perforate diaphragm disk 8 fixed to the perforate diaphragm carrier plate 6 is located at the focus of the objective so that each plane wave 9 of a laser beam parallel to the optical axis 10 and passing inlet 11 is transmitted through the unit. A hole 12 serves for air equilibration as will be explained later in the manufacture of the lens-pinhole unit. Ledge 4 together with the carrier plate 6 define a groove into which a lever-like tool can be inserted for forceably separating the plate 6.

The swivel-and-slide holder illustrated in FIG. 2 and hereinafter described, serves for the assembly of the lens-pinhole unit and its use.

Figure 2:
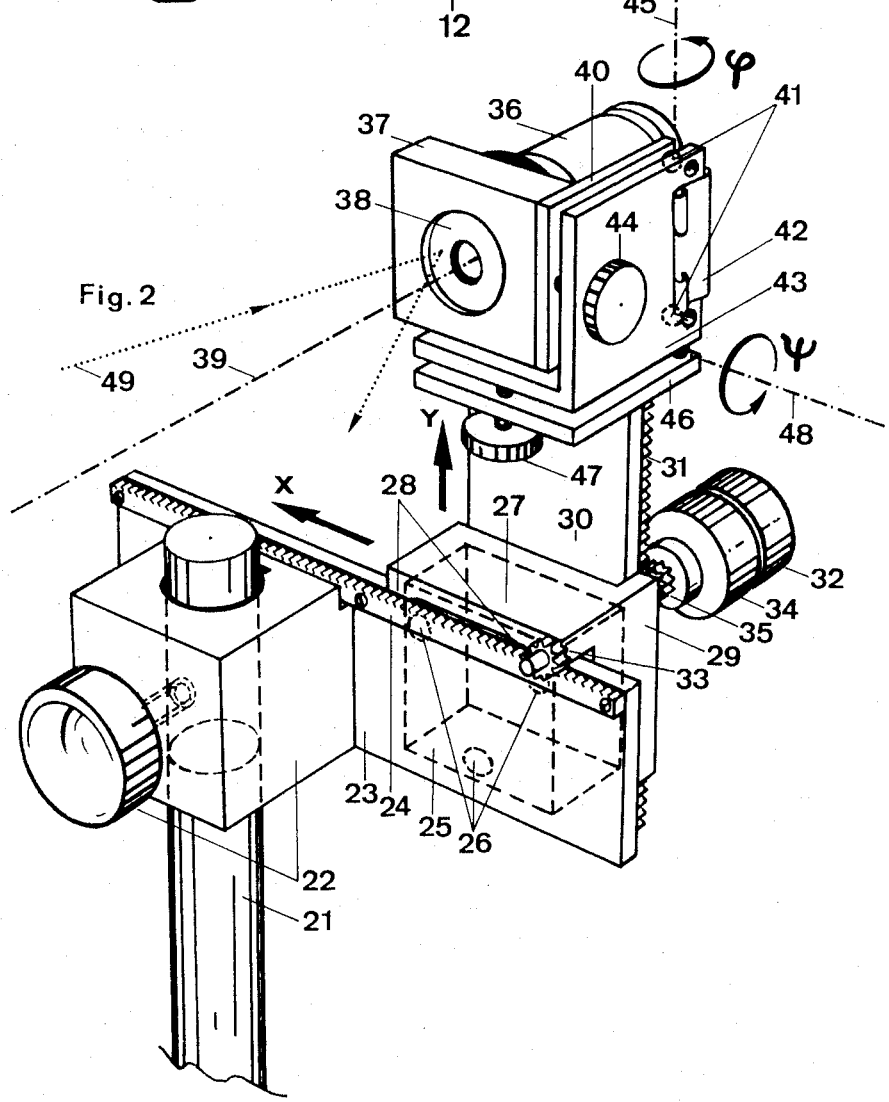
FIG. 2 is a perspective view of a swivel-and-slide mounting for the lens and pinhole unit.

The swivel-and-slide holder illustrated in FIG. 2 is fastened in the required position on a fixed pillar 21 by means of a screw clip device 22 carrying a first lapped slide bar or bracket 23 with a rack 24 for displacement in the X-direction. A magnetized body 25 is directly held on one side on the vertical surface of slide bar 23 by bearing on three-points of contact 26 fastened thereto and on the other side indirectly on the upper horizontal surface of the slide bar 23 through a pole piece 27 having two contact areas 28 fastened thereto. Hence the magnetized body 25 is magnetically coupled to bracket 23 without physical attachment thereto, merely by contact at five points. In similar manner, the other end of the magnetized body 25 is supported from a second lapped slide bar or bracket 30, the body 25 being connected to a pole shoe 29 which engages the second slide bar 30 having a rack 31 for displacement in the Y-direction. A shaft extends through a hole in the pole shoes and secured to the shaft is a rotary control knob 32 and a corresponding first pinion 33 engaging rack 24. A rotary control knob 34 is secured to a second pinion 35 in mesh with the rack 31 and the control knob 34 is mounted for free rotational movement on the shaft. Hence, by rotating knob 32, the assembly of bracket 23, body 25 and bracket 30 is displaced in the X-direction whereas when knob 34 is rotated, bracket 30 is raised or lowered in the Y-direction.

A lens-pinhole unit 36, whose construction has been described with reference to FIG. 1 1, is screwed into a base 37 in which a centrally perforated glass plate 38 is embedded flush, its top surface on the objective side being provided with a reflex-preventing impermeable layer while its other reflecting surface is perpendicular to the optical axis 39. One end of a plate 40 is bolted to base 37, the other end having two holes for receiving two steel balls 41 conjointly pressed by a resilient clip 42 against a correspondingly perforated upstanding flange of an angle member 43, so that a three point contact with a vertical axis of rotation results through both spherical centers in conjunction with a corner set screw 44. Similarly the lower flange of angle member 43 is connected by a clip (not shown) and balls to a soleplate 46 and a setscrew 47, so that a horizontal axis of rotation 48 is formed coplanar with the vertical axis of rotation 45. Plate 46 and slide bar 30 are secured together.

The illustrated swivel-and-slide mounting is of simple construction but nevertheless accurately allows a backlash-free displacement of the lens-pinhole unit 36 in the X- and Y- directions and a swiveling of the lens-pinhole unit around two perpendicularly coplanar axes of rotation 45 and 48 in the direction $\phi$ and $\psi$. The connection of slide bars 23 and 30 by the magnetized body 25 permits the holder to be separated into individual parts without using a tool and to fit two holders beside each other by using the same horizontal slide bar 23.

Two modes of operation for the lens-pinhole unit will now be described by way of example.

A standard utilization as described in the introduction in connection with a known lens-pinhole unit is the illumination of a target area with a spherical laser wave free from interference fields from a determined distance and this is achieved with the present lens-pinhole unit mounted in the swivel-and-slide holder of FIG. 2 by placing the optical axis of said unit coaxial with the plane wave of the laser beam according to one of two alignment modes described hereafter. Consequently, such plane wave is automatically focussed at the diaphragm aperture and transmitted thereby. Common to both modes is the employment of a small perforated projector screen, introduced into the laser beam between the laser and the lens-pinhole unit in such manner that the beam passes through a perforation in the screen.

The projector screen (not shown) is made, for example, of ferromagnetic material, is colored black on the side facing the laser so as to prevent reflections and white on its other side and is freely slidably mounted on a magnetic support.

The first setting mode is effected in the following stages:

1. Direct the laser beam without inserted lens-pinhole unit 36 onto the center of a target area (as in the known lens-pinhole units).

2. Mount the holder of FIG. 2 (with the lens-pinhole unit 36 therein) at a particular distance from the target area. Place the projector screen between the laser and the holder such that the laser beam passes through an aperture of the screen. Adjust the lens-pinhole unit 36 by operation of the holder such that the unit 36 is approximately coaxial to the laser beam. When this is done the various lens surfaces partially reflect the beam so that a pattern of eccentric interference rings appears on the surface of the projector screen facing the lens-pinhole unit 36, these being easily brought into concentric superimposition by regulation of the two setscrews 44, 47. The axes are now parallel and the filtered beam emerges through the diaphragm aperture 7.

3. By translation of the unit 36 in the X and Y directions, the pencil of rays is centered onto the target area, whereby the beam and the optical axis are now coaxially adjusted. The perforated glass plate 38 flush mounted in baseplate 37 is not used in this mode of setting.

With certain object glasses, the interference patterns described cannot be brought simultaneously into concentric position because their lenses are not aligned with interferometrical accuracy. In such cases it is advantageous to use the following second setting mode, in which again a perforated projector screen is inserted between the laser and the lens-pinhole unit.

1. Direct the laser beam without inserted lens-pinhole unit 36 onto the center of the target area as before.

2. The projector screen, holder and unit 36 are mounted along the laser beam as before. On the unblackened side of glass plate 38 the laser beam 49, shown in dotted line in FIG. 2, is reflected in axially offset position onto the projector screen. An accurate setting of the setscrews 44 and 47 is made so that the reflected laser beam passes back through the same aperture in the projector screen. The beam and the optical axis are now parallel and the filtered beam emerges through the diaphragm aperture 7.

3. By translating the lens-pinhole 36 in the X and Y directions, the pencil of light once more can be centered on the target area, whereupon the beam and the optical axis are now coaxially adjusted.

For assembling the lens-pinhole unit according to FIG. 1, first the objective 1 is screwed into the swivel-and-slide holder of FIG. 2. A dephasing mechanism (not shown) is tightly screwed onto the objective base 37 (FIG. 2), allowing, in known manner, fine displacement in the three coordinate directions, of the diaphragm carrier plate 6 together with the diaphragm disk 8 which are secured to it with a centrally perforated pot magnet in the vicinity of the objective focus. Between the support 2 and the periphery of the carrier plate 6, a synthetic resin interlining of low viscosity is applied annularly. The resin can be any suitable plastic material, such as a two-component epoxy resin which hardens quickly, i.e., in about 5 minutes after the hardener and base are mixed. The laser beam is passed by one of the two preveiously described setting modes coaxially into the inlet 11 and the carrier plate 6 is displaced on the soft resin until the center of the diaphragm aperture 7 rests at the focus, after which the synthetic resin lining 5 is allowed to cure to a hard state within a few minutes so that the objective 1 and the perforate diaphragm 8 remains firmly fixed in a correctly set position, after which the dephasing mechanism (not shown) can be separated from the lens-and-perforate-diaphragm unit.

The lens-pinhole unit according to the invention exhibits various advantages as compared to the current combinations of objective lens and perforate diaphragm. Once the unit is in use, the troublesome process of successive approximation is avoided and is replaced by a simple setting procedure.

The present lens-and-perforate-diaphragm unit furthermore offers simple construction and small size. In addition, the three micrometric fine motions required in existing lens-pinhole combinations can be replaced by one simple mechanical device (FIG. 2) for positioning of the lens-pinhole unit. Finally a change of direction of the filtered, expanded laser beam within the limits of the objective aperture as well as the replacement of lens-pinhole units for various degrees of expansion of the laser beam without readjustment of the lens-pinhole unit becomes possible.

As seen from the above, the present invention is predicated on the concept that by permanently fixing the pinhole or diaphragm aperture at the focal point of the achromatic objective lens, any light entering the lens as a plane wave parallel to the optical axis will pass through the unit. Hence, the problem of aligning the lens and centering the pinhole is reduced to the task of aligning the single unit.

What is claimed is:

1. A lens-pinhole unit for coherent light comprising an objective lens, a support having one end secured to said objective lens, a carrier plate, a diaphragm with a pinhole aperture supported by said plate and a connection between said carrier plate and said support in the form of a hardened synthetic resin layer which positions the pinhole in said diaphragm at the focus of the objective lens.

2. A unit as claimed in claim 1, wherein said support is screwed onto the objective lens.

3. A unit as claimed in claim 1, wherein said synthetic resin interlining consists of a two-component plastic material.

4. A unit as claimed in claim 1, wherein said support includes a ledge facing said carrier plate to define a groove therebetween.

5. A process for operating the lens-pinhole unit as claimed in claim 1 for illuminating a target area from a particular distance with a spherical laser wave free from interference fields, said process comprising mounting said unit at said particular distance in front of the target area, arranging the optical axis of the unit parallel to the laser beam and centering the cone of light onto the target area by translation of the unit in two directions perpendicular to each other and to the laser beam, such that the optical axis of the lens-pinhole unit and laser beam are coaxial.

6. A process as claimed in claim 5, wherein the laser beam is initially directed onto the center of the targer area before the lens-pinhole unit is inserted into the laser beam and prior to the parallel correction.

7. A process as claimed in claim 6, wherein a perforated projector screen is positioned along the laser beam in front of the lens-pinhole unit such that the laser beam passes through a perforation in said screen whereupon said unit is aligned approximately coaxially to the laser beam, observing a pattern of eccentric interference fringes emanating from partial reflections of the laser beam on the lens surfaces of the objective lens appearing on the projector screen, and pivoting said unit relative to the laser beam to cause the interference fringes to be arranged concentrically around the perforation in said projector screen.

8. A process as claimed in claim 6, wherein a perforated projector screen is positioned along the laser beam in front of the lens-pinhole unit such that the laser beam passes through a perforation in said screen, mounting a plane, perforate reflecting plate perpendicularly to the optical axis of the objective in the ray path directly in front of the objective and pivoting the lens-pinhole unit together with said reflecting plate relative to the laser beam so that the laser beam reflected by said plate reflects directly into the perforation of the projector screen.

9. Apparatus for use in the process as claimed in claim 5, comprising a swivel-and-slide device including a first stationary slide bar, a second slide bar movable perpendicularly to the first slide bar, a magnetic body slidably supporting said slide bars, manually operated drive means for moving the slide bars relative to the magnetic body, to effect a relative motion between the first slide bar and the magnetic body or between the magnetic body and the second slide bar in two directions perpendicular to each other.

10. Apparatus as claimed in claim 9, wherein each slide bar is specifically supported statically on the magnetic body at five points.

11. Apparatus as claimed in claim 9, comprising a soleplate secured to the second slide bar, an angle member pivotably mounted on said soleplate, and a bracket secured to the lens-pinhole unit and pivotably connected to the angle member along a pivot axis perpendicular to the pivot axis of the soleplate to the angle member.

12. Apparatus as claimed in claim 11 comprising connections between the angle member and the soleplate and bracket to provide said pivotal mountings therebetween, each connection including a spring clip and two spherical members between the angle member and the respective element to which it is pivotably connected and a setscrew remote from the pivotal connection.

13. A process for assembling the lens-pinhole unit as claimed in claim 1, comprising mounting the objective lens on a support capable of movement along two perpendicular axes and for pivotal movement around said axes, securing the carrier plate to a device which is movable in three mutually perpendicular directions with respect to said support, adjusting the position of the carrier plate to form an annular gap between the support and the carrier plate, applying the synthetic resin in said gap, aligning the optical axis of the objective lens coaxially with the laser beam until the center of the pinhole is at the focus of the objective lens and allowing the synthetic resin to cure and harden in place.

* * * * *